United States Patent [19]

Miller

[11] 4,384,550
[45] May 24, 1983

[54] THERMAL RECEIVER

[75] Inventor: Joseph A. Miller, Thousand Oaks, Calif.

[73] Assignee: Rockwell International Corporation, El Segundo, Calif.

[21] Appl. No.: 218,398

[22] Filed: Dec. 19, 1980

[51] Int. Cl.³ ............................................. F22B 37/24
[52] U.S. Cl. .................................. 122/510; 126/117; 165/162
[58] Field of Search ................ 122/510, 511; 165/162, 165/171, 82; 126/417, 444

[56] References Cited

U.S. PATENT DOCUMENTS

| | | | |
|---|---|---|---|
| 1,796,945 | 3/1931 | Harter . | |
| 1,904,182 | 4/1933 | Weingartner | 122/235 D |
| 2,252,069 | 8/1941 | Fletcher | 122/365 |
| 3,286,767 | 11/1966 | Evans | 165/82 |
| 3,530,835 | 9/1970 | von Wiesenthal | 122/510 X |
| 3,608,528 | 9/1971 | Mieth | 122/510 |
| 3,835,920 | 9/1974 | Mondt | 122/510 X |
| 3,861,360 | 1/1975 | Shank, Jr. | 122/510 X |
| 3,896,771 | 7/1975 | Chayes et al. | 122/510 |
| 4,123,994 | 11/1978 | Gersch et al. | 122/6 A |

Primary Examiner—Edward G. Favors
Attorney, Agent, or Firm—Henry Kolin; Clark E. DeLarvin; H. Fredrick Hamann

[57] ABSTRACT

A thermal receiver assembly comprising a base member and a support structure affixed to said base member and extending vertically therefrom. The thermal receiver assembly further includes at least one thermal heat collecting assembly which is supported by the base member. The heat collecting assembly comprises a plurality of vertically extending, parallel, spaced-apart conduit members having inlet and outlet ends. The inlet ends terminate in an inlet manifold for receiving a coolant, and the outlet ends terminate in an outlet manifold for removal of heated coolant. The heat collecting assembly further includes a plurality of substantially horizontally extending and vertically flexible attachment members having an end affixed to the support structure and another end affixed to individual conduit members to permit vertical movement of individual conduit members while restraining said conduit members from any substantial horizontal movement.

8 Claims, 7 Drawing Figures

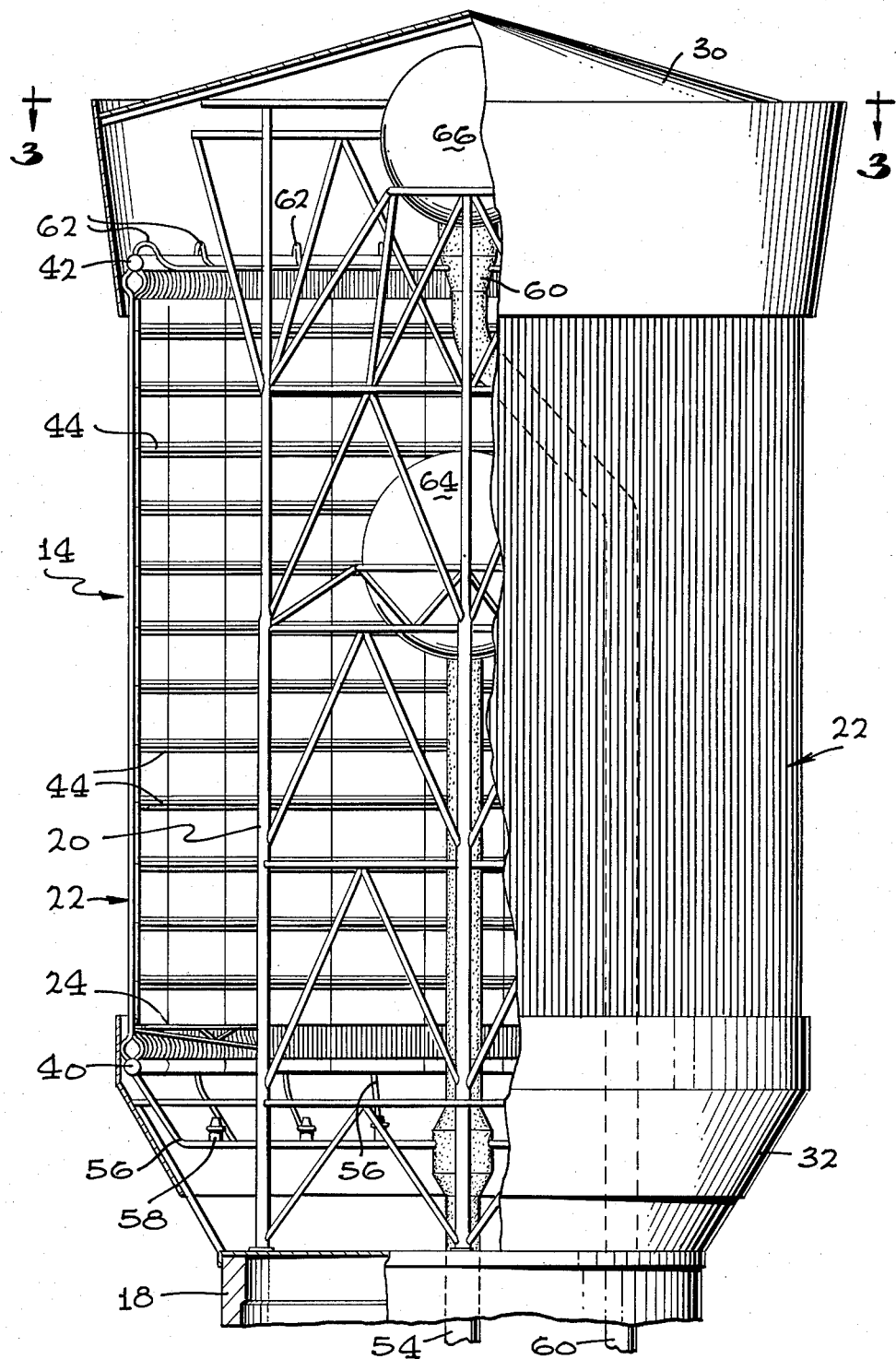

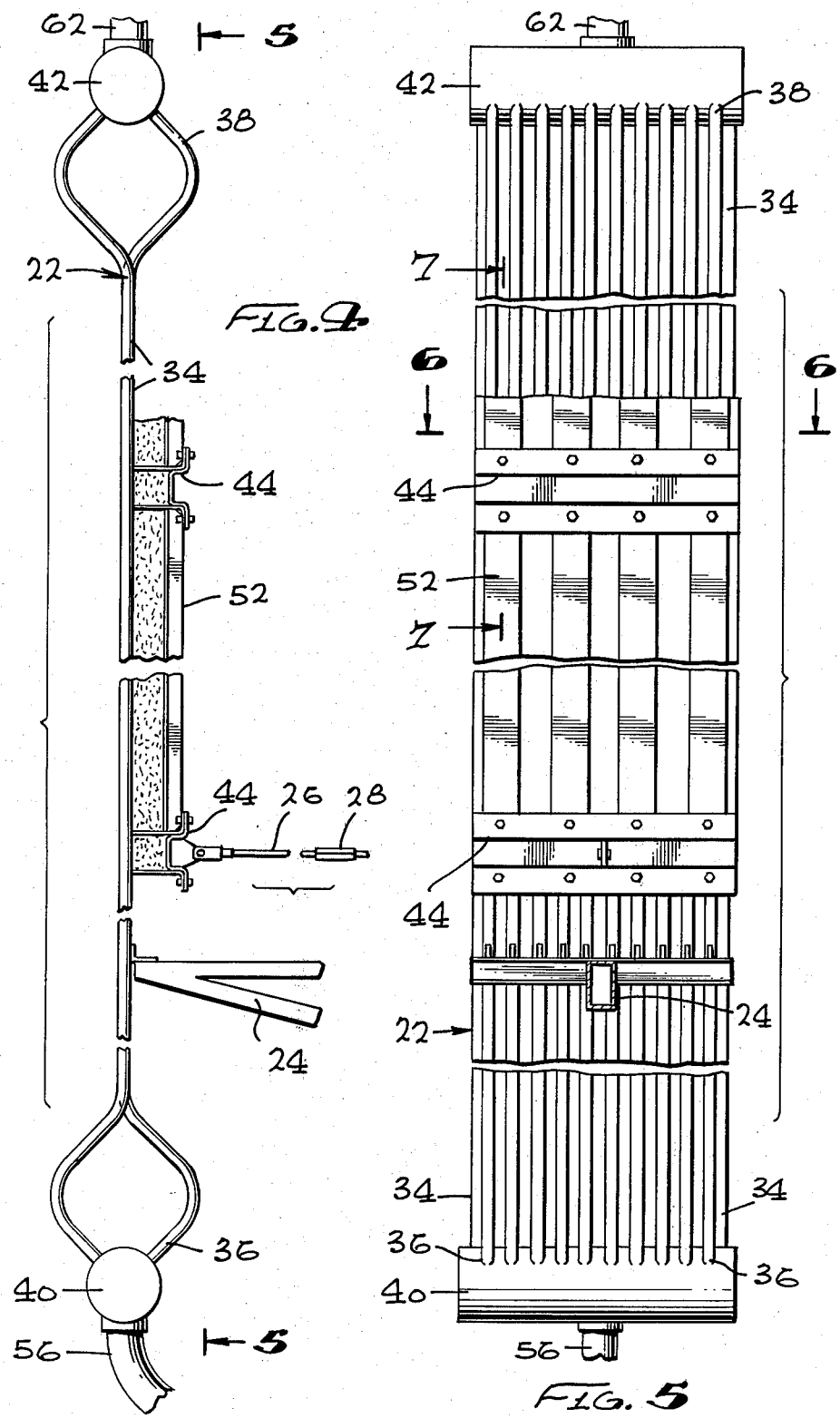

FIG. 6
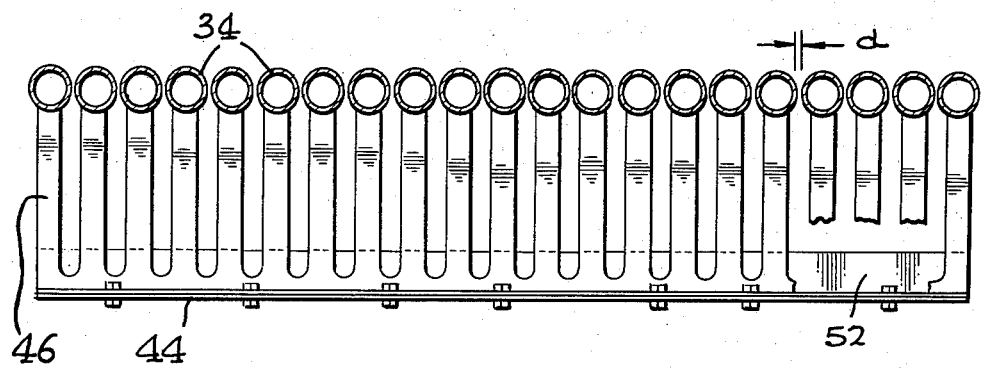
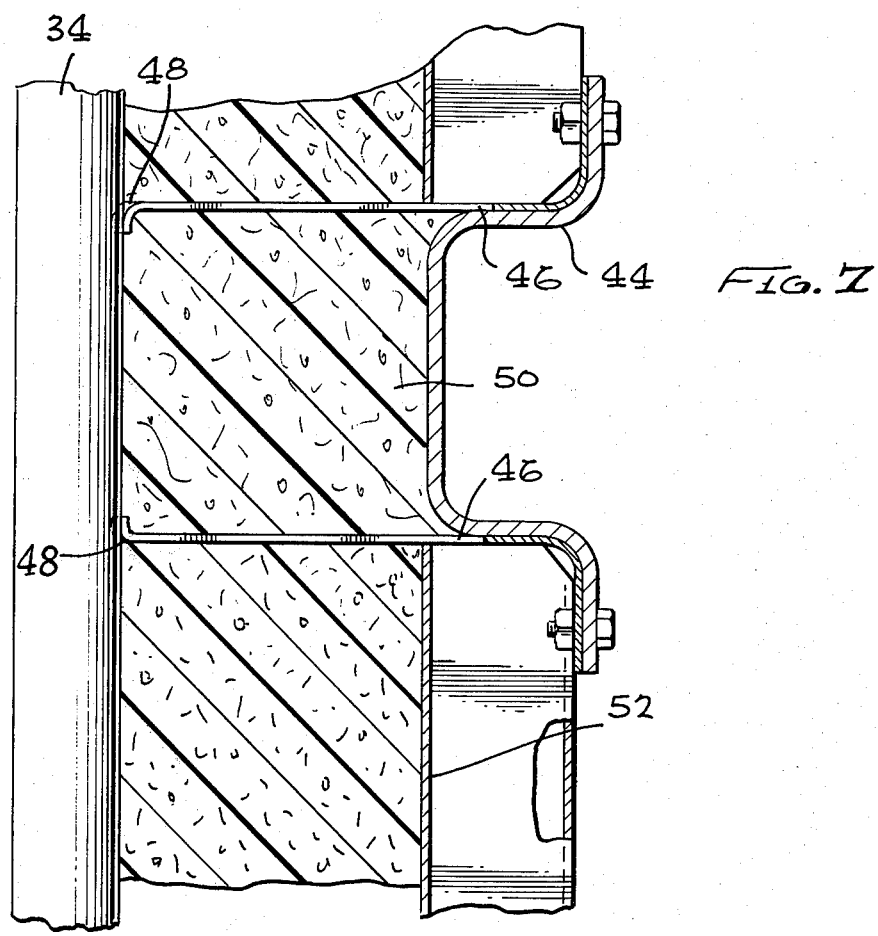
FIG. 7

THERMAL RECEIVER

FIELD OF THE INVENTION

The present invention broadly relates to a heat exchanger assembly and more particularly it relates to a thermal receiver assembly for receiving radiant energy and transferring it to a fluid coolant. In a particularly preferred embodiment of the invention, it relates to a thermal receiver assembly for use in a central solar powered utility.

BACKGROUND ART

Numerous devices are known for transmitting heat from one fluid to another in which the two fluids do not contact one another or become mixed. However, most of these devices are not directly applicable to a solar heated receiver wherein radiant thermal energy is transferred to a fluid. For example, U.S. Pat. No. 1,796,945 discloses a heat exchanger wherein two spaced-apart tube plates are inclined with tubes extending between the two plates and having one end attached to the upper plate. The fluid to be heated passes along the outside of the length of the tubes.

U.S. Pat. No 2,252,069 also relates to a heat exchange apparatus and is particularly concerned with tubular connections through which liquid or fluid is introduced into pressure vessels such as a vapor generator. The invention disclosed therein provides tubular connections which are particularly applicable to high pressure boilers wherein the feed from an economizer to a steam or water drum of the boiler varies widely in temperature due to operating conditions beyond the control of the designer.

U.S. Pat. No. 3,286,767 provides a tube support arrangement for use in a heat exchanger tube bundle. It specifically describes a tube support spacer for use in a tube bundle comprising a plurality of nested helical tube coils wherein the tube support arrangement provides support for the tubes both in a horizontal and a vertical direction while permitting relative differential expansion between adjacent coils of tubes.

U.S. Pat. No. 3,896,771 discloses a spacer and guide assembly for vertical superheater tubes. The spacer and guide assembly include a horizontal tube and guide lug means which are integral with the vertical tubes, and spacer lug means which are integral with the horizontal tube and coacting with the guide lug means so as to permit relative movement of the tubes. The guide lug means and spacer lug means are so related to each other that limited relative movement between the vertical and horizontal tube causes rubbing or contacting action between the spacer lug means and the guide lug means but not between the vertical and horizontal tubes or between either of the tubes and the spacer lug means or guide means.

U.S. Pat. No. 4,123,994 relates to an apparatus for suspension of a tube wall. It particularly relates to a combustion chamber wall in which the tube wall is made of finned tubes welded gas-tight with one another and extend horizontally or inclined, for example, helically-formed wound finned tubes on a steam generator. The proposed apparatus comprises a combination of tie rods interconnected to the helically formed wound finned tubes by means of welding bridges which permit the tie rods to expand in width independent of longitudinal expansion of the finned tubes.

The principal problem with most of the prior art heat exchange devices, however, is they are intended for transfer of heat from one fluid to another. Thus, they are not directly applicable to a solar heated receiver wherein the heat transfer is effected by radiation and wherein one side of the thermal receiver may be at a substantially higher temperature than the opposite side. Further, during the course of the day, a solar heated thermal receiver is subject to extreme heat flux variations from the collectors or heliostats ranging from the cool ambient morning temperatures to the peak daytime temperatures. Still further, the large size of a central solar receiver presents additional difficulties in that the expanse of metal is so great that the temperature differences result in significant changes in size; and the likelihood of excessive stress being applied to connections as a result of such changes is greatly enhanced.

SUMMARY OF THE INVENTION

The present invention provides a thermal receiver assembly which is particularly well suited for the transfer of radiant solar energy to a fluid coolant. Broadly, the thermal receiver assembly comprises a base member having a support structure affixed thereto which extends vertically upward. Further, at least one thermal heat collection assembly is provided which is supported by said base member, the heat collecting assembly including a plurality of vertically extending, parallel, spaced-apart conduit members having inlet and outlet ends. The inlet ends terminate in an inlet manifold for receiving a coolant, and the outlet ends terminate in an outlet manifold for removal of heated coolant. There also is provided a plurality of substantially horizontally extending, vertically flexible attachment members having an end affixed to said support structure and another end affixed to the conduit members to allow vertical movement of individual conduit members while restraining the conduit members from any substantial horizontal movement.

In accordance with a particularly preferred embodiment, there is provided a plurality of thermal heat collecting assemblies arranged about the periphery of the support structure and spaced therefrom. Each of the thermal heat collecting assemblies comprises a planar array of parallel, vertically extending, spaced-apart conduit members which terminate at their lower end in an inlet manifold and at their upper end in an outlet manifold. In this particularly preferred embodiment, the horizontally extending attachment members have an end affixed to a different conduit member, and the horizontal support brackets of adjacent thermal heat collecting assemblies are attached to one another forming a closed loop whereby individual tubes are free to move in a vertical direction. The horizontal support brackets are in turn connected to the support structure by tie members whereby the support structure, tie members, and attachment members cooperate to prevent any substantial horizontal movement of the planar array of conduit members.

It is a particular advantage of the present invention that substantially all of the vertical support for the thermal heat collecting assemblies is provided by the base member and that substantially all of the horizontal restraint to the heat collecting assemblies is provided by the support structure such that upon thermal expansion of the conduit members they are free to move in a vertical direction. Further, if the tubes do not expand linearly a uniform amount, the attachment members permit individual movement of tubes to prevent undue stress on any connections. Another advantage is that by having the individual conduit members spaced apart and not directly connected to one another, the individual conduit members are free to expand radially without exerting undue stress on adjoining conduit members or distorting the receiver assembly. Further, in the preferred embodiment wherein support brackets are utilized that are joined together to adjacent assemblies to form a closed loop, they cooperate to prevent bowing of the conduit members which could result when only one side of the conduit member is exposed to radiant heat with the resulting uneven temperature gradient across the member. These and other advantages of the present invention will become apparent from the following detailed description.

DESCRIPTION OF THE DRAWINGS

FIG. 2 is an enlarged partially cutaway elevation view of the thermal heat collecting assembly of the present invention;

FIG. 4 is a side view in partial cross section of the thermal heat collecting assembly taken along line 4—4 of FIG. 3;

FIG. 5 is an elevation view of the thermal heat collecting assembly taken along line 5—5 of FIG. 4;

FIG. 6 is an end view of the thermal heat collecting assembly taken along line 6—6 of FIG. 5; and FIG. 7 is an enlarged section of the assembly taken along line 7—7 of FIG. 5.

PREFERRED EMBODIMENT

Figure 3:
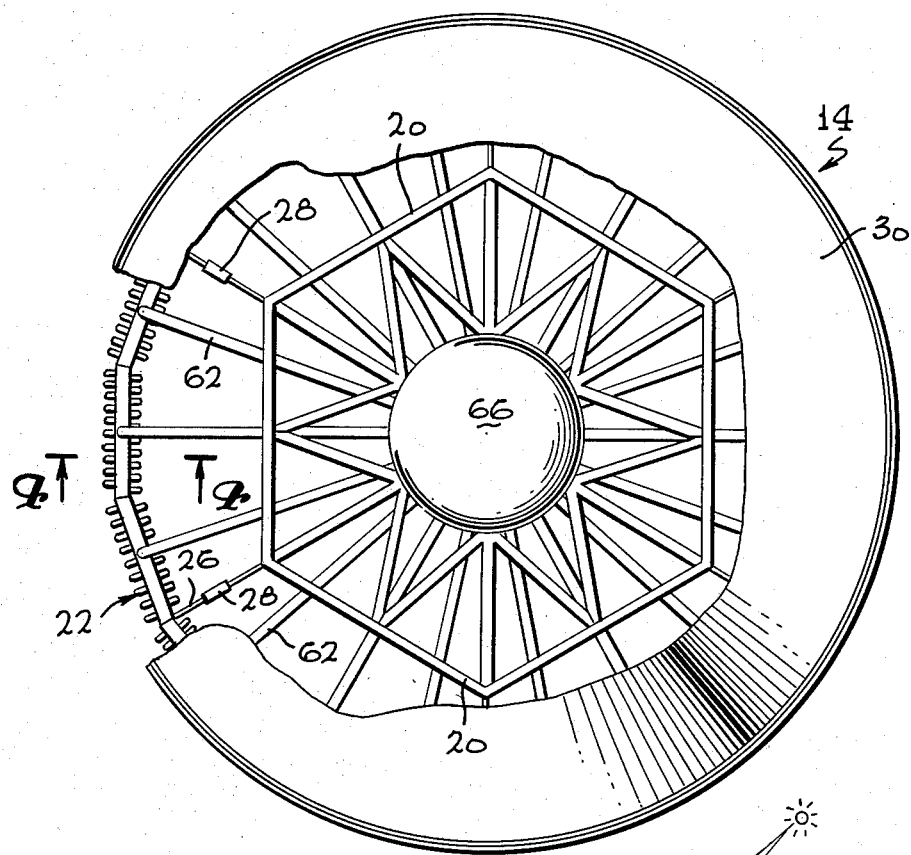
FIG. 3 is a plan view, partially cut away, of the thermal heat collecting assembly taken along line 3—3 of FIG. 2.
Figure 1:
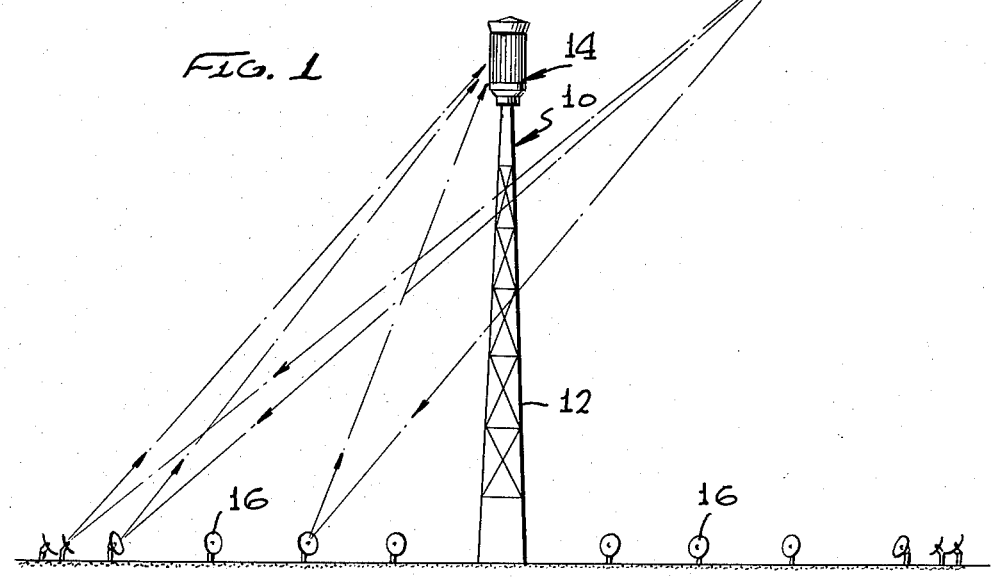
FIG. 1 is an elevation view of a central solar receiver utilizing the thermal heat collecting assembly of the present invention.

Referring now to FIG. 1, therein is depicted a central solar heating system 10 which comprises a vertical tower 12 having located on its top, a thermal heat receiver 14. Located about the periphery of tower 12 is a plurality of heat collectors or heliostats 16 which collect thermal energy from the sun, focus it, and redirect it to thermal heat receiver 14. Referring to FIGS. 2 and 3, therein is depicted an enlarged view, partially cut away, of thermal heat receiver 14. Receiver 14 comprises a base member 18 which supports a vertically extending support structure 20. As depicted, support structure 20 comprises a skeletal structure of load bearing members, such as welded tubes. Located about the periphery of support structure 20 is a plurality of thermal heat collecting assemblies 22 that will be described in more detail later. Heat collecting assemblies 22 are supported adjacent their lower end by a beam member 24. It is a key feature of the present invention that substantially all of the weight or vertical support for heat collecting assemblies 22 be provided adjacent their lower end as depicted in this preferred embodiment. Heat collecting assemblies 22 are supported by a base member 18 via beam member 24 and support structure 20. Lateral or horizontal support for heat collecting assemblies 22 is provided by a plurality of tie rods 26 which interconnect heat collecting assemblies 22 and support structure 20. Preferably, tie rods 26 are provided with some means for tension adjustment such as turnbuckles 28. Thermal receiver 14 further includes upper and lower shroud members 30 and 32, respectively, which shield certain portions of heat collecting assemblies 22 from the sun's rays.

Referring now to FIGS. 4 and 5, therein is depicted a typical thermal heat collecting assembly 22 of the present invention. Each of the heat collecting assemblies 22 comprises a vertically extending array of substantially planar, parallel, spaced-apart, conduit members 34. Each of conduit members 34 has an inlet end 36 and an outlet end 38 which terminate in an inlet manifold 40 and outlet manifold 42, respectively. It will be noted that each of the ends of conduit members 34 is bent to form a semicircle prior to joining their respective manifolds, with each alternate conduit member being bent in a different direction. The purpose of this is to facilitate welding of the closely spaced tubes. Specifically, this arrangement provides space to permit welding of the ends of the conduit members to the manifold.

Conduit members 34 are connected to tie rod 26. As shown more clearly in FIGS. 4, 5, and 7, each of the conduit members 34 is attached to a horizontally extending substantially rigid support bracket 44 via a vertically flexible attachment member 46. In the particular preferred embodiment depicted, attachment member 46 is a thin piece of flat metal having a plurality of vertically flexible tangs along one edge. Each of the tangs is affixed to a different conduit member. The exact manner in which attachment member 46 is affixed to conduit members 34 is not particularly critical and may be accomplished using any conventional mechanical attachment means. In the embodiment depicted one end is affixed to bracket 44 with a threaded fastener, such as a nut and bolt; and the other end having the tangs is fastened to tube member 34 by a braze or weld 48. When a plurality of heat collecting assemblies 22 is utilized, the support brackets 44 of adjoining assemblies are secured together to form a closed loop or hoop and provide additional rigidity to the assembly.

Referring to FIG. 6, it is seen that there is a gap having a width d between tube members 34. The purpose of the gap d is to allow for radial expansion of conduit members 34 when they are heated to the normal operating temperature of the assembly. This gap allows for unrestrained radial expansion of individual conduit members to avoid placing undue stress on adjacent members, and more importantly, to avoid distortion of heat collecting assembly 22. The space in between support brackets 44 and conduit members 34 preferably is filled with an insulation material 50 (FIG. 7) to prevent or minimize the transfer of thermal energy from conduit members 34 to any internal support structures. Insulation material 50 is retained in place by retainer member 52 which may be, for example, corrugated sheet metal.

Referring again to FIGS. 2 and 3, it is seen that each of the inlet manifolds 40 of the individual heat collecting assemblies 22 is connected to a common coolant inlet line 54, via a plurality of feeder lines 56. Advantageously, intermediate each heat collecting assembly 22 and coolant inlet line 54 there is provided a valve 58 to control the flow of coolant, isolate individual assemblies and facilitate any repairs or maintenance that may become necessary. The outlet manifold 42 of each individual heat collecting assembly 22 also is connected to a common outlet line 60 by a plurality of return lines 62. Advantageously, thermal receiver 14 further includes coolant storage tanks 64 and 66 which are in fluid communication with feeder lines 56 and return lines 62, respectively. The function of these tanks is described in more detail later.

In operation, the sun's rays are collected by the array of heliostats 16 and focused on thermal receiver 14. Coolant is introduced through the coolant inlet line 54 where it is dispersed through feeder lines 56 to the array of heat collecting assemblies 22. The coolant flows upwardly through conduit members 34 where it absorbs the radiant heat reflected on to assemblies 22. The heated coolant passes through outlet manifold 42, return lines 62, and main outlet line 60. Thereafter, the heat from the coolant may be utilized in any desired manner, for example, by passing it in heat exchange relationship with a working fluid, such as water, to produce steam for the generation of electricity or any other desired purposes. The precise coolant utilized is not critical and may be any of those used or comtemplated heretofore. For example, the coolant may be a gas, a liquid such as water, an organic solvent, or even a molten salt, or it may be a liquid metal. The currently preferred coolant is liquid-sodium based because of its availability, cost, and heat capacity.

As the intensity of the radiant heat directed to thermal receiver 14 increases from the early morning hours to mid-day, the temperature of conduit members 34 increases from ambient to the intended operating temperature. By virtue of the space d between conduit members 34, substantially unrestrained radial expansion of individual conduit members 34 takes place. Advantageously, gap d is such that upon reaching the design operating temperature, adjoining conduit members are in contact with one another, such that substantially no radiant energy passes between adjacent members. Obviously, any radiant energy passing therethrough must be absorbed by the insulation material, and not only is such energy lost but it also could be detrimental to the structural integrity of the internal supporting structure. Conversely, however, if gap d is too small, the radial expansion of conduit members 34 will cause unnecessary and potentially damaging stress to the conduit members and their associated restraining structure. Also, such expansion could result in substantial deformation of the configuration of the thermal receiver 14. Such deformation could in turn result in uneven heating of the conduit members leading to even further deformation. Accordingly, gap d, at ambient temperatures, should be selected such that upon reaching the normal operating temperature, the adjacent conduit members are in contact with one another. The exact dimension of this gap will vary, of course, depending upon the intended operating temperature, wall thickness, tube diameter, and the like. However, it is readily within the skill of one versed in the art to determine the appropriate gap.

In addition, it will be appreciated that uneven heating, while undesirable, cannot be completely avoided. Accordingly, certain tubes will expand in a linear direction, as well as radially, in unequal or uneven amounts. However, since vertical support for heat collecting assemblies 22 is provided only adjacent to their lower end, they are free to grow vertically by virtue of the flexibility of tie rods 26 and flexible attachment members 46.

Advantageously, receiver 14 is provided with coolant storage tanks 64 and 66. In the event of a pump failure, for example, tank 64 could contain a quantity of coolant under pressure. In the event of such a failure, coolant would be forced out of tank 64 and through feeder lines 56 to maintain coolant flow through heat collecting assemblies 22 until such time as the heliostats could be turned away from receiver 14. Alternatively, or in addition thereto, coolant storage tank 66 also could be located at a higher elevation than outlet manifolds 42. In the event of a rupture of inlet line 54, the coolant stored in storage tank 66 would drain, by gravity, out through return lines 62 and down through heat collecting assemblies 22 until such time as the heliostats could be turned away from receiver 14.

While herein is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the various shapes of the structural elements may vary considerably and still provide the intended function. Thus, while the support structure disclosed herein is a welded tubular member, it obviously could be formed in a variety of other ways and utilize other fastening means. It will be equally apparent that a variety of coolants could be used in the present invention, as well as a different source of radiant thermal energy. Accordingly, therefore, the invention should not be limited by the preceding express description.

What is claimed is:

1. A thermal receiver assembly comprising:

a base member;

a support structure affixed to said base member and extending vertically therefrom;

at least one thermal heat collecting assembly supported by said base member, said assembly including a plurality of vertically extending, parallel, spaced-apart conduit members having inlet and outlet ends, said inlet ends terminating in an inlet manifold for receiving a coolant therefrom and said outlet ends terminating in an outlet manifold for removal of heated coolant, one manifold being located adjacent said base member and the other manifold being located adjacent an upper end of said thermal heat collecting assembly; and a plurality of substantially horizontally extending attachment members having an end affixed to said support structure and an opposite end comprising a plurality of vertically flexible tangs, each of said tangs being affixed to different conduit members for allowing vertical movement of individual conduit members while restraining said members from any substantial horizontal movement.

2. The thermal receiver of claim 1 wherein said conduit members are bent adjacent their inlet and outlet ends prior to terminating in said manifolds.

3. The thermal receiver assembly of claim 2 wherein there is provided insulation means intermediate the thermal heat collecting assemblies and the support structure.

4. The thermal receiver assembly of claim 3 further including means for passing a fluid coolant to said inlet manifold and withdrawing it from said outlet manifold.

5. A thermal receiver assembly comprising:

a base member;

a substantially rigid support structure affixed to said base member and extending vertically therefrom;

a plurality of thermal heat collecting assemblies supported by said base member and arranged about the periphery of said support structure and spaced therefrom, each of said thermal heat collecting assemblies comprising a planar array of parallel, vertically extending, spaced-apart conduit members having inlet and outlet ends, each of said inlet ends terminating in an inlet manifold for receiving a coolant therefrom and each of said outlet ends terminating in an outlet manifold for removal of heated coolant, said inlet manifold being located adjacent said base member and said outlet manifold being located adjacent an upper end of said thermal heat collecting assemblies, said heat collecting assemblies further including a plurality of substantially horizontally extending attachment members, each of said attachment members having an end affixed to a horizontal support bracket and an opposite end comprising a plurality of vertically flexible tangs, each of said tangs being affixed to different conduit members, the horizontal support brackets of adjacent thermal heat collecting assemblies being attached to one another forming a closed loop whereby individual tubes are free to move in a vertical direction while they are restrained from any substantial horizontal movement; and a plurality of tie members interconnecting said support structure with selected ones of said horizontally extending support brackets.

6. The apparatus of claim 5 wherein said conduit members are bent adjacent their inlet and outlet ends prior to terminating in said manifolds.

7. The thermal receiver assembly of claim 6 wherein there is provided insulation means intermediate the thermal heat collecting assemblies and the support structure.

8. The thermal receiver assembly of claim 7 further including means for passing a fluid coolant to said inlet manifold and withdrawing it from said outlet manifold.

* * * * *